United States Patent [19]

Taddei

[11] 4,364,612
[45] Dec. 21, 1982

[54] LOWER PAIR KINEMATIC ASSEMBLY WITH HYDROSTATIC BEARING

[75] Inventor: Franco Taddei, Milan, Italy
[73] Assignee: Casper S.p.A., Pavia, Italy
[21] Appl. No.: 175,675
[22] Filed: Aug. 5, 1980
[51] Int. Cl.³ .................... F16C 32/06; F16C 33/10
[52] U.S. Cl. .................................. 308/5 R; 308/9
[58] Field of Search ........... 308/3 A, 5 R, 9, DIG. 1, 308/122, 170

[56] References Cited

U.S. PATENT DOCUMENTS

| | | | |
|---|---|---|---|
| 3,063,039 | 11/1962 | Taft | 308/9 |
| 3,399,001 | 8/1968 | Whitaker | 308/170 |
| 3,611,697 | 10/1971 | Greb | 308/9 |
| 3,644,053 | 2/1972 | Braikevitch et al. | 308/9 |
| 3,753,604 | 8/1973 | Arsenius | 308/9 |
| 3,969,042 | 7/1976 | Bächler | 308/9 |
| 4,260,205 | 4/1981 | Spies | 308/9 |

Primary Examiner—Richard R. Stearns
Attorney, Agent, or Firm—Fleit & Jacobson

[57] ABSTRACT

A lower pair kinematic assembly has two relatively movable mechanical members, such as relatively rotatable columns of a radial drilling machine, which slide relatively to each other through interfitting conjugate surfaces equipped with a hydrostatic bearing system. When pressure is supplied to the hydrostatic bearings the surfaces can slide relatively to permit relative movement of the members, but when the bearings are inoperative the surfaces interfere with each other to lock the members together automatically. The interference between the members may be adjusted hydraulically.

2 Claims, 1 Drawing Figure

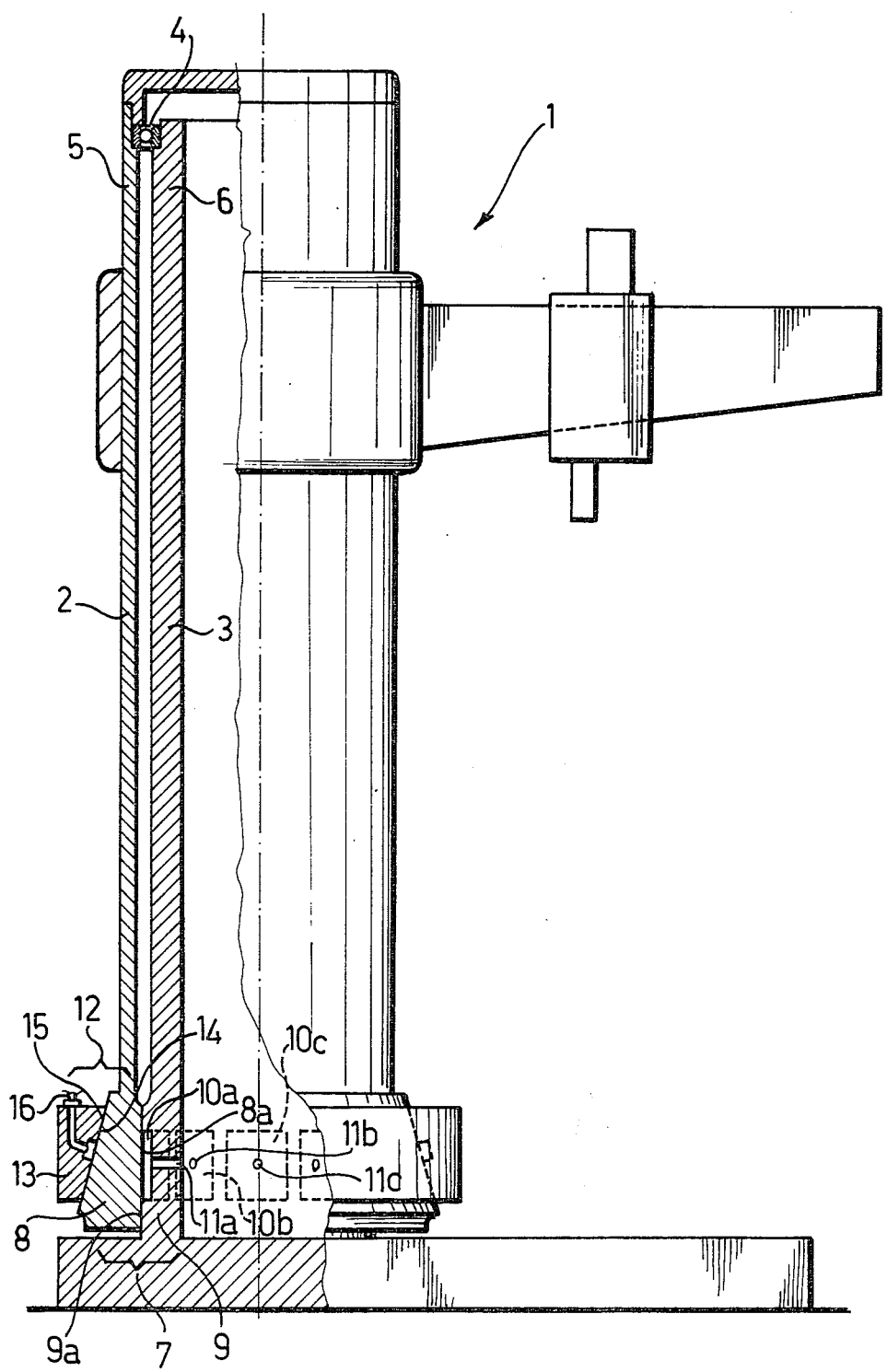

LOWER PAIR KINEMATIC ASSEMBLY WITH HYDROSTATIC BEARING

The present invention relates to a lower pair kinematic assembly, that is, a kinematic assembly of two relatively movable mechanical members which are relatively conjugated, or joined, in such a way that their relative movement is unequivocally determined, the members being in contact with each other through identical conjugate mating surfaces. Examples of such lower pairs are a turning pair and a sliding pair used for the accurate positioning of relatively movable parts in machine tools.

The two mechanical members of the type lower pair kinematic assembly to which the present invention relates are coupled by a hydrostatic bearing, that is to say, they are provided on one of the two conjugate surfaces with a plurality of pockets which are supplied, in use of the assembly, with a fluid under pressure to constitute a hydrostatic bearing systems between the conjugate surfaces, as known per se.

In the description which follows reference is made to a pair of the turning type in which the two members are relatively rotatable. It will be understood by those skilled in the art, however, that the invention is equally applicable to kinematic pairs of other types, for example a sliding pair having a hydrostatic bearing.

An example of two mechanical members which constitute a lower pair of the turning type is to be found in the inner and outer coaxial support columns of a radial drilling machine, in which the outer column is rotatable with respect to the inner column through a bearing at the lower end of the outer column. In a pair of this type it is necessary to effect relative locking between the two members of the pair, for example when the members have reached a predetermined relative position.

In the known art, such locking is effected by additional means, either of the positive type or of the friction type.

An example of the positive type of locking is bolt means carried by one of the two members and engageable in cooperating notch means carried by the other member. Such bolt means have the disadvantage that locking is limited to pre-established relative positions of the two members.

An example of locking of the friction type is hydraulic cylinders, incorporating preloaded springs, interposed between the two members to exert on them a force of predetermined magnitude so as to give rise to a friction force sufficient to prevent the relative movement. Such hydraulic cylinders suffer from the disadvantage that the locking force is non-uniformly distributed.

Other disadvantages of the known locking means are their cost, their bulk and their weight.

The object of the present invention is to provide a lower pair of the aforesaid type, in which the members of the pair are lockable with respect to one another without incurring the above-mentioned disadvantages.

The problem is resolved by a pair of the aforesaid type, wherein the members of the pair have a predetermined interference with one another for their relative locking.

The main advantage of the pair according to the invention resides in the fact that the members can be locked, in any relative position whatsoever, in an extremely simple manner.

The pair is preferably provided with pre-loading means for generating said interference and for varying it as required.

The invention will be better understood from the following description of a preferred embodiment, given by way of non-limitative example, with reference to the annexed drawing, which shows a lower pair according to the invention as applied to a radial drilling machine.

With reference to the drawing, reference numeral 1 indicates generally part of a radial drilling machine comprising an outer column 2 and a coaxial inner column 3. The outer column 2 is rotatable about the inner column 3 by means of a rolling element bearing 4, known in itself, located at the upper ends 5 and 6 of the columns 2 and 3, and by means of a turning pair 7 according to the invention, located at the respective lower ends 8 and 9 of the columns 2 and 3. The said ends 8 and 9 constitute the two mechanical members of the turning pair 7. In particular the members 8 and 9 are relatively constrained through respective identical and interfitting conjugate surface 8a and 9a.

The member 9 is provided on the surface 9a with a plurality of pockets 10a, 10b, 10c ... to which hydraulic fluid under pressure may be supplied, through respective ducts 11a, 11b, 11c ..., to form a hydrostatic bearing system, known per se, between the members 8 and 9 of the pair 7.

In the absence of fluid under pressure in the bearing pockets 10a, 10b, 10c ... there is a predetermined interference between the members 8 and 9, of a value sufficient to ensure relative locking of the members.

In the illustrated embodiment the pair 7 is provided with pre-loading means, generally indicated 12, for generating said interference and for varying it as required. The pre-loading means 12 comprise a ring 13 which rests at a predetermined position on the lower end of member 8 and cooperating therewith through respective conical conjugate surfaces 14 and 15, and a duct 16 for directing fluid under pressure between the said conical surfaces 14 and 15.

The operation of the illustrated pair 7 according to the invention is as follows. When the hydrostatic bearing system is inoperative, that is to say, in the absence of fluid under pressure in the pockets 10a, 10b, 10c ..., the members 8 and 9 of the pair 7 are locked relatively to each other by virtue of the aforesaid interference between the members 8 and 9.

When, on the other hand, the hydrostatic bearing system is operative, that is to say, when fluid under pressure is supplied to the pockets 10a, 10b, 10c ..., the resulting deformation of the members 8 and 9 under the action of the fluid pressure effectively eliminates the interference between the members 8 and 9, creating a clearance between the members to allow their relative movement.

The interference is initially generated, and subsequently varied as required, by directing fluid under pressure through the duct 16, and by fitting the ring 13 over the conical surface 15 of the member 8 until a predetermined position is reached. The ring 13 rests on the lower end of member 8 and remains stably in the predetermined position during the operation of the fluid supply system to duct 16.

The pair according to the invention has been described purely by way of example with reference to a turning pair, as applied to a radial drilling machine. The pair may, however, be any type of lower pair, for example a pair of the linearly sliding type such as is used in rectilinear guides and slides of machine tools, without departing from the spirit and scope of the present invention.

The main advantage of the lower pair according to the invention lies in the fact that the members of the pair can be locked in any relative position whatsoever, in an extremely simple manner, by suspending the feeding of hydraulic fluid under pressure to the pockets of the hydrostatic bearing system.

Another advantage of the pair according to the invention resides in the fact that the magnitude of the locking force of the pair is adjustable as required, by adjustment of the pre-loading means which generate the said interference and by varying the latter as required.

I claim:

1. A lower pair kinematic assembly comprising:
    two relatively movable, coaxial mechanical members with respective identical conjugate surfaces;
    hydrostatic bearing means between said members;
    means for relatively constraining the said conjugate surfaces of said two relatively movable mechanical members when said hydrostatic bearing means is inoperative, said constraining means including at least one annular member surrounding the outside surface of the outer of said two coaxial mechanical members, said annular member defining bearing means around said outside surface, and means for supplying fluid under pressure to said bearing means defined by said annular member to precisely lock said two mechanical members relative to each other.

2. The lower pair kinematic assembly of claim 1 wherein said annular member and said outside surface of the outer of said mechanical members have conical conjugate surfaces, and said bearing means includes duct means for directing fluid under pressure between said conical surfaces.

* * * * *

UNITED STATES PATENT AND TRADEMARK OFFICE
CERTIFICATE OF CORRECTION

PATENT NO. : 4,364,612
DATED : December 21, 1982
INVENTOR(S) : Franco TADDEI

It is certified that error appears in the above-identified patent and that said Letters Patent are hereby corrected as shown below:

On the title page,

Section [73] Assignee: change "Casper S.p.A., Pavia, Italy" to --Caser S.p.A., Pavia, Italy--.

Signed and Sealed this

Twenty-sixth Day of April 1983

[SEAL]

Attest:

GERALD J. MOSSINGHOFF

Attesting Officer

Commissioner of Patents and Trademarks